United States Patent Office 2,717,257
Patented Sept. 6, 1955

2,717,257

REDISTRIBUTION OF ORGANOSILANES

Ben A. Bluestein, Schenectady, N. Y., assignor to General Electric Company, a corporation of New York No Drawing. Application September 9, 1952,
Serial No. 308,719

7 Claims. (Cl. 260—448.2)

This invention is concerned with a process for the redistribution of organosilanes and for the preparation of organohalogenosilanes, especially alkyl halogenosilanes, from mixtures of alkyl halogenosilanes, in which part of the product obtained as a result of the redistribution reaction has a ratio of alkyl groups to silicon atoms different from the ratio of alkyl groups to silicon atoms in the starting ingredients in the reaction mixture. More particularly, the invention relates to a process which comprises effecting reaction at an elevated temperature, e. g., above 250° C., between (1) a preformed compound corresponding to the general formula $$(R)_mSiCl_{(4-m)}$$

and (2) a preformed compound corresponding to the general formula $$(R')_nSiCl_{(4-n)}$$

where R is an alkyl radical, R' is a member selected from the class consisting of alkyl and aryl radicals, e. g., monovalent aromatic hydrocarbon radicals, $m$ is a whole number equal to from 1 to 4, and $n$ is a whole number equal to from 0 to 3, and $n$ may equal 4 where R and R' are dissimilar alkyl radicals (e. g., methyl and ethyl radicals), the aforesaid reaction being carried out in the presence of a metal halogenoaluminate of the formula $$MAlX_4$$

where M is an alkali metal, e. g., sodium, potassium, lithium, etc., and X is a halogen, e. g., chlorine, bromine, fluorine, etc.

In the pending application of Robert O. Sauer Serial No. 3,835, filed January 22, 1948, and assigned to the same assignee as the present invention, now U. S. Patent 2,647,136 issued July 28, 1953, there is disclosed and claimed a process for preparing alkyl halogenosilanes by a redistribution process employing mixtures of alkyl halogenosilanes, by which process are obtainable alkyl halogenosilanes having an alkyl to silicon ratio different from the alkyl to silicon ratio of the starting ingredients present in the mixtures. In the practice of the invention described in the aforesaid Sauer application, a catalyst employed for optimum results is aluminum chloride. Although aluminum chloride is generally satisfactory for the purpose, in some respects its use is accompanied by serious disadvantages. In the first place, because of the fact that aluminum chloride sublimes at the elevated temperatures at which redistribution (i. e., redistribution of alkyl or aryl groups and halogens) takes place, it is necessary to effect reaction between the alkyl halogenosilanes in the presence of the aluminum chloride under superatmospheric pressure in a closed vessel. Otherwise, the catalyst will sublime, especially when the reaction is carried out at atmospheric pressure, permitting the catalyst concentration to drop to such an extent that it may completely disappear from the reaction mass. Another disadvantage residing in the use of aluminum chloride as a catalyst is that it is unsatisfactory on a continuous process because of the pressure equipment required. Moreover, the time required to attain equilibrium conditions using the aluminum chloride is excessive and in many instances requires from 7 to 10 hours to effect complete reaction.

I have now discovered that all the disadvantages inherent in the use of aluminum chloride for redistribution purposes can be obviated and other improvements attained by employing in place of the aluminum chloride a metallic halogenoaluminate corresponding to the general formula $$MAlX_4$$

where M and X have the meanings given hereinbefore. For brevity, this metallic halogenoaluminate will hereinafter be referred to as "metallic aluminate." The user of the metallic aluminate permits operation of the process not only at superatmospheric pressure and batch processing, but what is more advantageous, also permits operation at atmospheric pressure (or even under superatmospheric pressure) on a continuous basis whereby it is possible to deposit the metallic aluminate on an inert carrier and continuously pass over the ingredient or mixture of ingredients which it is desired to convert in substantial yields to another organohalogenosilane having a different organic-to-silicon ratio than is present or predominantly present in any of the starting ingredients. In addition, it has been found that the time required to effect conversion to the desired organosilane is materially lower and in many respects is only a matter of minutes or even seconds before adequate and satisfactory conversion is attained as compared to the hours required using aluminum chloride.

The discovery that the metallic aluminate would effect the redistribution described above was entirely unexpected and in no way could have been predicted since the latter is not a Friedel-Crafts catalyst in the same way that aluminum chloride is. In addition, the metallic aluminate does not act under the same conditions as does aluminum chloride. Thus, whereas aluminum chloride will effect reaction and redistribution, for instance, between trimethylchlorosilane and silicochloroform to give methyldichlorosilane ($CH_3SiHCl_2$), the substitution of the metallic aluminate, for example, sodium chloroaluminate, in place of aluminum chloride in the reaction between these two ingredients does not give under equivalent conditions any detectable amount of methyl-dichlorosilane.

Among the compounds (thus indicating the radicals for which R and R' stand) embraced by the aforementioned general formulas $$(R)_mSiCl_{(4-m)}$$

and $$(R')_nSiCl_{(4-n)}$$

are, for instance, silicon tetrachloride, tetramethylsilane, tetraethylsilane, methyltrichlorosilane, ethyltrichlorosilane, phenyltrichlorosilane, butyltrichlorosilane, dimethyldichlorosilane, trimethylchlorosilane, diphenyldichlorosilane, tolyltrichlorosilane, diethyldichlorosilane, triethylchlorosilane, dipropyldichlorosilane, di-isopropyldichlorosilane, triphenylchlorosilane, dibutyldichlorosilane, tri-isobutylchlorosilane, amyltrichlorosilane, lauryltrichlorosilane, etc. Where mixtures of organochlorosilanes are employed, it is desirable that the organic groups attached to the silicon atom be the same in order to facilitate ease of separation of the products. Good results may also be obtained by employing the metallic aluminate to effect redistribution of mixtures of phenyl silanes with alkyl silanes, for example, mixtures of phenyl chlorosilanes and alkyl chlorosilanes. Mixtures of alkyl or aryl halogenosilanes or mixtures of inorganic halogenosilanes (free of silicon-bonded hydrogen) with organochlorosilanes, or mixtures of inorganic chlorosilanes with tetra-alkyl silanes, or mixtures or alkyl chlorosilanes and tetra-alkyl silanes, etc., are among the additional combinations of ingredients which may be employed in the practice of the present invention.

The manner whereby my process may be practiced may be varied within wide limits. Although the reaction may be effected under superatmospheric pressure, I have found that atmospheric pressure reactions are readily consummated and, in many respects, desirable in order to be able to operate on a continuous basis. This, of course, does not preclude the possibility of operating, as pointed out above, under superatmospheric pressure in a batch or continuous process manner. The flexibility of practicing the presently claimed process under both superatmospheric and atmospheric pressures is a decided advantage over the use of, for example, aluminum chloride, as a catalyst for the rearrangement reaction which can only be operated satisfactorily under superatmospheric pressure.

In the practice of the present invention, it is essential that at least one of the ingredients present in the reaction mixture contain an organosilane having an organic group attached to the silicon atom by a carbon-silicon linkage. This ingredient is not required to have a silicon-bonded chlorine atom. However, the other ingredient or ingredients present in the mixture are not required to have a silicon-bonded organic group and may be an inorganic silicon halide (free of silicon-bonded hydrogen) specifically, silicon tetrachloride. Thus, the mixture of ingredients may comprise, for instance, methyltrichlorosilane and trimethylchlorosilane, trimethylchlorosilane and silicon tetrachloride, silicon tetrachloride and tetramethylsilane, tetramethylsilane and methyltrichlorosilane, dimethyldichlorosilane and silicon tetrachloride, trimethylchlorosilane and triphenylchlorosilane, dimethyldichlorosilane and diphenyldichlorosilane, diethyldichlorosilane and tetraethylsilane, tetramethylsilane and tetraethylsilane, etc. Obviously, other alkyl or aryl groups may be attached to silicon atoms by carbon-silicon linkages.

The temperature at which reaction is caused to proceed may also be varied depending upon such factors as, for example, the particular halogenosilane or silanes employed, the time of reaction, the presence or absence of pressure, etc. I have found that good results are obtained if temperatures of the order of from about 250° to 500° C. or even higher are employed. Temperatures above 500° C. may be employed provided shorter reaction times are used to minimize undesirable losses due to side reactions or decomposition. Insufficient reaction occurs at temperatures below 250° C. to make the use of temperatures below this value of any practical advantage. Obviously, the temperature may be varied widely depending on the time of contact of the reacting ingredients with the metallic aluminate. This is especially true in cases where atmospheric pressure reactions are concerned in which the reacting ingredients are passed over inert bodies coated and impregnated with the metallic aluminate. Under the latter conditions, the rate of passage of the reaction mixture can be varied widely and when this is done, obviously the temperature also can be varied to a large degree.

The time for effecting the redistribution reaction may be varied within wide limits depending, for instance, on the temperature employed, the presence or absence of pressure, the time of contact of the reaction mixture with the metallic aluminate, etc. At atmospheric pressures and at a normal rate of passage of the reaction mixture, the reaction described herein proceeds substantially at a satisfactory rate even after only a few seconds to a few minutes, for example, from about 15 seconds to about 2 to 3 minutes of contact with the metallic aluminate. Obviously, longer times of contact may be employed without departing from the scope of the invention. After completion of the reaction, the individual ingredients are advantageously separated by conventional means.

When normal pressures are employed in conducting the reaction, the reactants are advantageously passed through a heated reaction zone or tube maintained at the required temperatures in which there is present a carrier or packing which contains the metallic aluminate deposited thereon. The carrier or packing may comprise, for instance, porous Alundum, pumice, porous clay, rock salt, silica, etc. In coating the carrier or packing with the metallic aluminate, several methods are available. In one instance, the metallic aluminate may be heated to an elevated temperature and when thus liquefied intimately mixed with the carrier or packing so as to coat and impregnate the packing. Alternatively, the metallic aluminate may be dissolved in a suitable solvent, the packing added to the solution of the metallic aluminate and intimately mixed, and thereafter the solvent evaporated to leave the packing containing an intimate deposit of the metallic aluminate. The procedure employed is not critical and will be apparent to those skilled in the art, realizing that the procedures used for this purpose are generally those well known in depositing catalysts on carriers.

The rate of passage of the reactants in the case of normal pressures over the packing containing the metallic aluminate can be varied widely depending in many respects on the type of reactant employed, the amount of catalyst used, temperature, pressure, etc. The more effective the catalyst, the faster is the through-put or the shorter the residence or contact time of the reaction mixture in the tube. Thus, taking a reaction tube about 2" in diameter containing about 1000 grams of Alundum spheres (¼" in diameter) containing 86 grams of catalyst, at a temperature of 440° C., it is possible to put through this tube 50 ml. of equal molar concentrations of methyltrichlorosilane and trimethyltrichlorosilane per hour so as to convert the chlorosilane mixture to a product containing 67% dimethyldichlorosilane. At this temperature a through-put of the 50 mil. in ½ hour will give approximately 54% dimethyldichlorosilane. When the temperature is dropped to about 400° C., the through-put of this mixture of methyltrichlorosilane and trimethylchlorosilane in one hour will give 40% dimethyldichlorosilane, and when through-put is increased so that the 50 ml. is run through the reaction tube in one-half at 400° C., it will give approximately 25% dimethyldichlorosilane. These variations are indications of the manner in which carrying out the reaction at normal pressures can be varied and will indicate to persons skilled in the art that the temperature and through-put rate should be balanced in order to obtain optimum yields of the desired products in the minimum amount of time.

The use of pressure equipment for conducting the reaction under superatmospheric pressure (either by batch or continuous processing) has been found to be advantageously carried out by heating the reaction mixture at the required temperatures so that the internal pressure varies from above atmospheric pressure to about 2000 to 3000 p. s. i. Side reactions, normally found complicating similar redistribution reactions using aluminum chloride as a catalyst are minmized when the metallic aluminate is employed instead.

The ratio of reaction ingredients employed may be varied widely within broad limits depending on the source of the reaction mixtures, the products available for reaction, the desired reaction product, etc. The ratio of the ingredients, if mixtures thereof are employed, will determine the amounts and types of products obtained as a result of carrying out the redistribution reaction. Thus, when equal molar concentrations of methyltrichlorosilane and trimethylchlorosilane are interacted, there will be obtained a mixture of methyltrichlorosilane, trimethyltrichlorosilane and dimethyldichlorosilane in which dimethyldichlorosilane will comprise a predominant proportion of the total weight of these three ingredients, provided equilibrium conditions have been attained. Obviously, if less than molar equivalents of methyltrichlorosilane and trimethylchlorosilane are employed, the amount of dimethyldichlorosilane will be reduced. Again, in, for instance, the reaction between silicon tetrachloride and tetramethylsilane, if one employs one mol of each of these two ingredients, one will obtain under equilibrium conditions a large amount of dimethyldichlorosilane which is in a predominant proportion together with small amounts of methyltrichlorosilane and trimethylchlorosilane, as well as unreacted silicon tetrachloride and tetramethylsilane. However, if one should employ one mol of silicon tetrachloride with three mols of tetramethylsilane, the predominant product will then be trimethylchlorosilane, and if one employs 3 mols of silicon tetrachloride and one mol of tetramethylsilane, the predominant product will be methyltrichlorosilane. It is thus apparent that the predominant product obtained in the reaction will be determined by the ratio of starting ingredients, that is, the ratio of organic groups to chlorine atoms in the individual compositions comprising the starting mixture.

Although the discussion above is concerned with reactions involving alkyl chlorosilanes, it will, of course, be apparent that the same applies to reactions involving aryl halogenosilanes or aryl silanes as, for instance, tetraphenylsilane and silicon tetrachloride or triphenylchlorosilane and silicon tetrachloride, etc. In addition, the present invention is intended to embrace not only reactions involving mixtures of ingredients whereby new products are formed, but also includes reactions involving single organohalogenosilanes. Thus, it is possible to effect reaction between dimethyldichlorosilane and the metallic aluminate at the elevated temperatures to obtain an equilibrium mixture comprising not only unreacted dimethyldichlorosilane, but substantial amounts of methyltrichlorosilane and trimethylchlorosilanes. It may be desirable in some operations to obtain increased yields of, for example, trimethylchlorosilane. In the direct reaction of methyl chloride and silicon in the presence of a catalyst such as copper, at the present time, the most desirable and predominant product is dimethyldichlorosilane. It may be desirable not to disturb the formation of the large amounts of dimethyldichlorosilane but it may at the same time be advantageous for a period of time to obtain increased supplies of methyltrichlorosilane or trimethylchlorosilane. By means of the present invention, it is possible to redistribute the dimethyldichlorosilane in the presence of the metallic aluminate to give good yields of methyltrichlorosilane and trimethylchlorosilane. Obviously, other single ingredients can be caused to react in the same manner as, for example, trimethylchlorosilane can be heated in the presence of a sodium chloroaluminate to give measurable yields of dimethyldichlorosilane and tetramethylsilane, etc.

It has also been found that organopolysilanes, for example, methylchloropolysilanes, specifically polysilanes containing from 2 to 4 or more silicon atoms attached to each other by silicon-silicon bonds and having distributed around the various silicon atoms, chlorine atoms and methyl groups, may be treated with the metallic aluminate to give good yields of methylchlorosilanes including methyltrichlorosilane, dimethyldichlorosilane, and trimethylchlorosilanes. Alternatively, it may be desirable to effect reaction between these organochloropolysilanes with organochloromonosilanes or with silicon tetrachloride or even with tetramethylsilane to give increased yields of organochloromonosilanes which are more useful than the polysilanes for making various organopolysiloxane products. Thus, I have effected reaction between trimethylchlorosilane and a mixture of methylchlorodisilanes obtained as a high boiling residue in the reaction between methyl chloride and silicon in the presence of copper as a catalyst to obtain sizeable yields of dimethyldichlorosilane, methyltrichlorosilane, and trimethylchlorosilane, in which the amount of dimethyldichlorosilane obtained is larger than is possible by merely treating the methylchlorodisilane mixture with the sodium chloroaluminate. These results indicate that the mixture of methylchlorodisilanes is broken down to monomeric methylchlorosilanes containing methyltrichlorosilane which, in the presence of trimethylchlorosilane added to the mixture or formed as a result of the cleavage of silicon-silicon bonds, will be caused to redistribute to give the increased yields of dimethyldichlorosilane.

It is desired to point out, as will be apparent to those skilled in the art, that where mixtures of organosilanes including organosilanes free of silicon-bonded halogen or organochlorosilanes are used, these mixtures may contain more than two alkyl or aryl silanes. One of the criteria in the practice of the invention is that one of the silanes in the organosilane be an organosilane in which there is present an organic group attached to silicon by a carbon-silicon linkage.

The metallic aluminate employed in the practice of the present invention may be any one of those available and known at the present time. For availability and ease of preparation, I prefer to use, for instance, sodium chloroaluminate or potassium chloroaluminate. The metallic aluminate thus prepared should be stable at the temperature of reaction. Referring directly to the preparation of sodium chloroaluminate (which is available commercially), this may be prepared by heating together a mixture of anhydrous aluminum trichloride and sodium chloride to give sodium chloroaluminate (NaAlCl$_4$). Directions for preparing these metallic aluminates may be found, for instance, on page 436 of the book by N. V. Sidgwick entitled The Chemical Elements and Their Compounds, published by the Oxford Press, 1950. In the following examples, more particular details will be given for the preparation of some of these metallic aluminates. The amount of metallic aluminate may be varied and when employed at superatmospheric pressures, good results may be obtained from about 0.5 to 5%, by weight, of the metallic aluminate used, based on the total weight of the reactants employed. When conducting the reaction at normal pressures, and when the metallic aluminate is deposited on a carrier, obviously the amount of metallic aluminate used may be varied widely. Persons skilled in the art will appreciate that the amount of metallic aluminate deposited should be sufficient to give adequate exposed surface to the reactants being passed over the surface of the catalyst.

In order that those skilled in the art may better understand how the present invention may be practiced, the following examples are given by way of illustration and not by way of limitation. All parts are by weight.

The superatmospheric pressure equipment employed in some of the examples below comprised a four-liter Aminco stainless steel bomb equipped with shaker and heater. In all cases, a 2½ liter stainless steel liner was used. In general, when using the pressure equipment, reagents were put into the bomb which was then heated to the desired temperature. The time recorded in the example below does not take into account the lengthy (2–3 hour) heating and cooling period. Unless otherwise stated, the atmospheric pressure redistribution reactions were carried out using a two-liter, four foot long glass tube equipped with a gas and liquid inlet and a condensing system at the receiver end. The tube was filled with porous clay chips (about ⅛" to 2" in size) and molten sodium chloroaluminate was poured through the reactor and absorbed on the clay. Prior to each run, the tube was heated to the desired temperature in an atmosphere of nitrogen.

The sodium chloroaluminate and potassium chloroaluminate were prepared by heating equimolar mixtures of, for example, anhydrous aluminum trichloride and sodium chloride, and anhydrous aluminum trichloride and potassium chloride to about 200° C. until fusion of the respective metallic chlorides to a homogeneous metallic aluminate was realized.

EXAMPLE 1

In this example an equimolar mixture of trimethylchlorosilane and methyltrichlorosilane was employed in each redistribution reaction. The trimethylchlorosilane was a commercial grade of trimethylchlorosilane substantially free of other impurities. The methyltrichlorosilane employed actually was a mixture which comprised, by weight, about 92% methyltrichlorosilane and about 8% dimethyldichlorosilane. This latter mixture, unless otherwise specified, will hereinafter be referred to as "methyltrichlorosilane." The following Table I shows the results of the reactions carried out at elevated pressures including the charges of materials, the reaction conditions, the products as analyzed, and further data as to the results. The analyses show the relative percents, by weight, of the mixture of three methylchlorosilanes present in the reaction product.

It will be noted that despite the fact that atmospheric conditions were employed, and despite the fact that the actual contact time was much less than that in which the reactions were subject to the redistribution process under superatmospheric pressure, the percent dimethyldichlorosilane obtained was relatively high, this despite the fact that it constituted only a single pass of the reactants over the sodium chloroaluminate. Further amounts of dimethyldichlorosilane can be obtained by recycling the mixture of unreacted methyltrichlorosilane and trimethylchlorosilane after removal of the dimethyldichlorosilane.

EXAMPLE 3

In this example, a large reaction tube was employed to carry out the redistribution of various mixtures of chlorosilanes and alkyl silanes. More particularly, the reaction tube comprised an 8-liter (40" long and 4" in diameter) steel reactor tube fitted with adequate heating means. In this example, two types of catalyst carriers were employed. One type comprised a porous clay carrier composed of

*Table I*

|  | Run No. 1 | Run No. 2 |
|---|---|---|
| Charge: |  |  |
| Chlorosilane | $CH_3SiCl_3(CH_3)_3SiCl$ | $CH_3SiCl_3(CH_3)_3SiCl$ |
| Weight, grams | 56   39 | 56   39 |
| Catalyst | $NaAlCl_4$ | $KAlCl_4$ |
| Wt. Catalyst, grams | 4 | 4 |
| Reaction Conditions: |  |  |
| Temp., °C | 340 | 330 |
| Pressure, p. s. i. | 250 | 460 |
| Time, hrs | 4 | 4 |
| Analyses of Methylchlorosilane Fractions: |  |  |
| Percent $(CH_3)_2SiCl_2$ | 49 | 52 |
| Percent $CH_3SiCl_3$ | 41 | 27 |
| Percent $(CH_3)_3SiCl$ | 10 | 21 |

EXAMPLE 2

This example illustrates the practice of the present invention as it relates to the redistribution of mixtures of methyltrichlorosilane and trimethyltrichlorosilane at atmospheric pressure by passing the mixture of methylchlorosilanes over a carrier, in this case a porous clay adsorbent, containing sodium chloroaluminate deposited thereon. The catalyst bed was prepared by packing 1400 grams of the porous clay adsorbent into the two-liter, four foot long glass tube (about 2" in diameter) and the molten sodium chloroaluminate in amount equal to 200 grams was poured through the reactor and adsorbed on the packed clay. The following Table II shows the results of the various runs conducted in connection with this series of redistribution reactions. The items found in Table II are self-explanatory. The heading "Residence Time" is defined as the ratio of the free space in the reaction to the gas velocity through the reactor. With the exception of Runs Nos. 9 and 10 in which there was present in the mixture of methylchlorosilanes a ratio of two mols of trimethylchlorosilane and one mol of methyltrichlorosilane, the other mixtures of methylchlorosilanes comprised essentially equal molar proportions of methyltrichlorosilane and trimethylchlorosilane.

pieces ¼" to 1" in width. The other carrier comprised Alundum in spherical form about ¼" in diameter. Several types of catalyst-carrier preparations were employed. Catalyst A was made by pouring and intimately mixing 2 lbs. of molten sodium chloroaluminate into 9 kg. of broken porous clay plates. Catalyst B was made by pouring and intimately mixing one pound of molten sodium chloroaluminate onto 9600 grams of hot Alundum spheres. Prior to each run, the reactor was heated to the desired temperature in a stream of dry nitrogen, and thereafter the chlorosilanes were introduced at the appropriate rate. The following Table III shows the reactants used, the conditions employed, and the percents of methylchlorosilanes obtained. In addition to showing the results of the redistribution processes carried out on mixtures of methyltrichlorosilane and trimethyltrichlorosilane, Table III also shows redistribution results carried out on a mixture comprising a low boiling by-product obtained in the direct process of making methylchlorosilanes by the reaction of methyl chloride with heated silicon in the presence of a catalyst such as copper (see Rochow Patent 2,380,995). This low boiling mixture comprised approximately, by weight, 13% tetramethylsilane, 14% trimethylchlorosilane, 4% dimethyldichlorosilane, 66% methyltrichlorosilane and 2% silicon tetrachloride. The yields of di-

*Table II*

| Run No. | Weight of Mixtures of Methyl- chloro- Silanes, grams | Temp., °C | Resi- dence Time, Minutes | Percent Weight, Reaction Products | | | |
|---|---|---|---|---|---|---|---|
|  |  |  |  | $(CH_3)_2SiCl_2$ | $CH_3SiCl_3$ | $(CH_3)_3SiCl$ | Residue |
| 3 | 25 | 360–370 | 45 | 68 | 16 | 16 |  |
| 4 | 60 | 360–365 | 17 | 58 | 25 | 16 | 1 |
| 5 | 30 | 390–395 | 7 | 66 | 23 | 11 |  |
| 6 | 40 | 385 | 35 | 63 | 26 | 11 |  |
| 7 | 63 | 385 | 16 | 62 | 27 | 11 | 8 |
| 8 | 110 | 385 | 11 | 50 | 35 | 14 | 8 |
| 9 | 57 | 380 | 15 | 60 | 13 | 26 | 4 |
| 10 | 57 | 380 | 11 | 55 | 17 | 28 | 4 | methyldichlorosilane, trimethylchlorosilane, and methyltrichlorosilane described in Table III are all in percentages, by weight, of the total reaction product recovered. The residence time is the same as that defined in Example 2.

action product collected. The reaction product was thereafter analyzed to determine the percent dimethyldichlorosilane formed as a result of carrying out the respective reactions. The weight percent dimethyldichlorosilane is intended to include the weight percent of this specific Table III

| Run No. | Ml. Charged | Catalyst | Temp., °C. | Throughput Time, Minutes | Residence Time, Minutes | Wt. Percent $(CH_3)_2SiCl_2$ | Wt. Percent $CH_3SiCl_3$ | Wt. Percent $(CH_3)_3SiCl$ |
|---------|-------------|----------|------------|--------------------------|-------------------------|------------------------------|--------------------------|----------------------------|
| 11 | 265 | None | 400 | 75 | 2.8 | 1 | 60 | 38 |
| 12 | 122 | A | 385 | 180 | 11 | 31 | 34 | 34 |
| 13 | 122 | A | 415 | 60 | 4 | 43 | 29 | 28 |
| 14 | 265 | B | 400 | 70 | 2.1 | 48 | 34 | 19 |
| 15 | 261 | B | 400 | 120 | 3.8 | 63 | 25 | 12 |
| 16 | 85 ml. $(CH_3)_3SiCl$ / 38 ml. $SiCl_4$ | A | 420 | 45 | 3 | 11 | 7 | a 46 |
| 17 | 44 g. $(CH_3)_4Si$ / 56 ml. $SiCl_4$ | A | 440 | 120 | 9 | 24 | 10 | b 23 |
| 18 | 245 ml., Low Boilers | B | 440 | 120 | 4 | 61 | 32 | c 5 | a Also obtained 36 wt. percent $SiCl_4$.
b Also obtained 24 wt. percent $SiCl_4$ and 2.6 wt. percent $(CH_3)_4Si$.
c Balance small amounts of $SiCl_4$ and $Si(CH_3)_4$.

EXAMPLE 4

In the foregoing examples, the metal aluminate employed was prepared by pouring the molten sodium chloroaluminate onto the hot carrier. In this example, the catalyst was deposited on the carrier which consisted in all cases of 1000 grams of Alundum spheres by forming the sodium chloroaluminate in situ on the carrier. Generally, this method comprised impregnating the carrier with an aqueous sodium chloride solution, drying the mixture to leave a well distributed layer of sodium chloride on the carrier, and subliming anhydrous aluminum chloride onto the hot sodium chloride-coated carrier. In this way the aluminum chloride reacted with the sodium chloride to form sodium chloroaluminate. By means of this procedure, increased catalyst surface area was obtained without undesirable plugging of the pores of the carrier.

Since the catalyst-carrier mixture was prepared somewhat differently in each of the runs described in the instant example, following is a brief description of how each catalyst-carrier was prepared. Designation of the catalyst-carrier mixture employed in each case will be run number in which this mixture was used in the example.

*Run No. 19.*—The carrier was soaked in a concentrated aqueous sodium chloride solution and dried in a 150° C. oven. This procedure caused the carrier to pick up about 28 grams of sodium chloride. The coated carrier was heated at 225° C. for about 16 hours in a closed vessel with 64 grams aluminum chloride to give a carrier which had an equivalent weight of 92 grams sodium chloroaluminate deposited thereon.

*Run No. 20.*—Treated similarly as was done in Run No. 19, by depositing 30 grams of sodium chloride on the carrier and interacting therewith 102 grams aluminum chloride; the treated carrier was then heated to 450° C. to remove excess aluminum chloride and to leave behind about 98 grams of sodium chloroaluminate.

*Run No. 21.*—Treated similarly as in Run No. 19, but after depositing 31 grams of sodium chloride on the carrier, the latter was heated to 450° C. for about 3 hours and thereafter reacted with about 70 grams of aluminum chloride to deposit an amount of sodium chloroaluminate equivalent to 98 grams.

The redistribution reactions described in the present example were carried out in a 1-liter vertical glass reaction tube equipped in the same way as the reaction tubes described in Examples II and III. The runs were all made at residence times of about 0.6 minute and 1.2 minutes. As described previously, the reactor was heated to the desired temperature in a stream of dry nitrogen and thereafter the mixture of chlorosilanes was passed through the heated zone at the desired rate and the reaction product obtained as a result of carrying out the described redistribution reactions.

The following Table IV shows the weight of the sodium chloroaluminate employed, the various residence times at different temperatures, under which conditions varying amounts of dimethyldichlorosilane were formed.

Table IV

WEIGHT PERCENT $(CH_3)_2SiCl_2$ FORMED AT VARIOUS CONDITIONS

| Temperature | | 400° C. | | 440° C. | | 470° C. | |
|-------------|---|---------|---|---------|---|---------|---|
| Residence Time | | 0.6 min. | 1.2 min. | 0.6 min. | 1.2 min. | 0.6 min. | 1.2 min. |
| Run No. | Wt. $NaAlCl_4$ | | | | | | |
| 19 | 92 | 23 | 41 | 50 | 53 | 55 | 63 |
| 20 | 98 | 45 | 53 | 54 | 63 | 67 | 71 |
| 21 | 98 | 47 | 61 | 55 | 69 | 62 | 66 |

As pointed out previously, another product obtained in the direct process reaction between methyl chloride and silicon in the presence of copper is a high boiling fraction boiling above dimethyldichlorosilane. This high boiling fraction comprises generally methylchloropolysilanes containing silicon-silicon linkages in which there may be present from 2 to 4 or more silicon atoms in the molecules and around these silicon atoms are distributed methyl groups and chlorine atoms. Generally, a large amount of this high boiling residue comprises a mixture of methylchlorodisilanes. A more detailed description of this high boiling residue may be found recited in U. S. Patent 2,598,435—Mohler and Sellers. I have unexpectedly found that this high boiling residue can be cracked to give low boiling materials comprising sizeable quantities of methyltrichlorosilane, dimethyldichlorosilane, and trimethylchlorosilane. Thus, when about 70 grams of this high boiling residue were passed through the reaction tube described and employed in Example III, using catalyst A, and the temperature of the reaction was maintained at about 425° C., and the throughput time was about 75 minutes, there was obtained a product which, on a weight basis, comprised 36% dimethyldichlorosilane, 31% methyltrichlorosilane, 6% trimethylchlorosilane, and 20% of a high boiling residue, the balance comprising materials such as silicon tetrachloride, etc.

It will, of course, be apparent to those skilled in the art that instead of using the ingredients employed in the redistribution process described in the foregoing examples, other mixtures or combinations of ingredients can be employed without departing from the scope of the invention. It is also intended that other metallic aluminates may be employed, many examples of which have also been given before, as well as other reaction conditions in general. The type of carrier used may also be varied and no intent is to be read into the present invention that it is limited to the carriers herein described.

My claimed process is also useful in connection with separating the azeotropic mixture of silicon tetrachloride and trimethylchlorosilane obtained as a result of the direct reaction of silicon and methyl chloride in accordance with the process described and claimed in the aforementioned Rochow Patent 2,380,995 issued August 7, 1945. Great difficulty has been experienced in separating the two components of this azeotropic mixture in view of the close boiling points of the components. By means of my invention it is now possible to utilize this azeotropic mixture by converting it to a composition containing methylchlorosilanes which can be more readily separated by the usual distillation procedures. The various ingredients obtained in the practice of the present invention have utility, for instance, in the preparation of silicone resins, lubricating oils, rubbers, etc.

What I claim as new and desire to secure by Letters Patent is:

1. The process for effecting reaction on a continuous basis between (1) a preformed compound corresponding to the general formula

and (2) a preformed compound corresponding to the general formula

where R and R' are alkyl radicals, $m$ is a whole number equal to from 1 to 4, $n$ is a whole number equal to from 0 to 3, and $n$ may equal 4 where R and R' are dissimilar alkyl radicals, which process comprises (a) simultaneously passing compounds (1) and (2) in the vapor phase through a reaction zone maintained at a temperature of from 250° to 500° C. and containing an inert carrier supporting an alkali-metal halogenoaluminate catalyst for the reaction, the reaction zone being substantially free of unsupported, sublimed catalyst at the reaction temperature and (b) continuously withdrawing the reaction product from the reaction zone.

2. The process as in claim 1 in which the alkali-metal halogenoaluminate is sodium chloroaluminate.

3. The process for effecting reaction on a continuous basis between methyltrichlorosilane and trimethylchlorosilane, which process comprises (a) simultaneously passing the latter two compounds in the vapor phase through a reaction zone maintained at a temperature of from 250° to 500° C. and containing an inert carrier supporting sodium chloroaluminate as a catalyst for the reaction, the reaction zone being substantially free of unsupported, sublimed catalyst at the reaction temperature, and (b) continuously withdrawing the reaction product from the reaction zone.

4. The process for effecting reaction on a continuous basis between trimethylchlorosilane and silicon tetrachloride, which process comprises (a) simultaneously passing the latter two compounds in the vapor phase through a reaction zone maintained at a temperature of from 250° to 500° C. and containing an inert carrier supporting sodium chloroaluminate as a catalyst for the reaction, the reaction zone being substantially free of unsupported, sublimed catalyst at the reaction temperature, and (b) continuously withdrawing the reaction product from the reaction zone.

5. The process for effecting reaction on a continuous basis between tetramethylsilane and silicon tetrachloride, which process comprises (a) simultaneously passing the latter two compounds in the vapor phase through a reaction zone maintained at a temperature of from 250° to 500° C. and containing an inert carrier supporting sodium chloroaluminate as a catalyst for the reaction, the reaction zone being substantially free of unsupported, sublimed catalyst at the reaction temperature, and (b) continuously withdrawing the reaction product from the reaction zone.

6. The process for effecting reaction on a continuous basis between tetramethylsilane and methyltrichlorosilane, which process comprises (a) simultaneously passing the latter two compounds in the vapor phase through a reaction zone maintained at a temperature of from 250° to 500° C. and containing an inert carrier supporting sodium chloroaluminate as a catalyst for the reaction, the reaction zone being substantially free of unsupported, sublimed catalyst at the reaction temperature, and (b) continuously withdrawing the reaction product from the reaction zone.

7. The process for effecting reaction on a continuous basis between a mixture of ingredients composed of tetramethylsilane, trimethylchlorosilane, and methyltrichlorosilane, which process comprises (a) simultaneously passing the aforesaid mixture of ingredients in the vapor phase through a reaction zone maintained at a temperature of from 250° to 500° C. and containing an inert carrier supporting sodium chloroaluminate as a catalyst for the reaction, the reaction zone being substantially free of unsupported, sublimed catalyst at the reaction temperature, and (b) continuously withdrawing the reaction product from the reaction zone.

References Cited in the file of this patent

UNITED STATES PATENTS

| 2,647,136 | Sauer | July 28, 1953 |
| 2,647,912 | Barry et al. | Aug. 4, 1953 |

FOREIGN PATENTS

| 663,691 | Great Britain | Dec. 27, 1951 |
| 985,985 | France | Mar. 21, 1951 |
| 999,637 | France | Oct. 3, 1951 |

OTHER REFERENCES

Norris et al., "Jour. Am. Chem. Soc.," vol. 62 (1940), pages 1432–5.